United States Patent
Seki et al.

(10) Patent No.: US 6,673,138 B2
(45) Date of Patent: Jan. 6, 2004

(54) MULTI-COLOR CRAYON OR OIL PASTEL AND METHOD OF PRODUCING THE SAME

(75) Inventors: Koji Seki, Saitama-ken (JP); Yoshimi Kano, Saitama-ken (JP)

(73) Assignees: Buncho Corporation, Tokyo (JP); Dong-A Pencel Co., Ltd., Daejeon (KR)

( * ) Notice: Subject to any disclaimer, the term of this patent is extended or adjusted under 35 U.S.C. 154(b) by 91 days.

(21) Appl. No.: 10/096,309

(22) Filed: Mar. 13, 2002

(65) Prior Publication Data
US 2002/0195021 A1 Dec. 26, 2002

(30) Foreign Application Priority Data

May 11, 2001 (JP) ........................ 2001-142462
Sep. 6, 2001 (JP) ........................ 2001-270776

(51) Int. Cl.$^7$ .............................. C09D 13/00
(52) U.S. Cl. .................................... 106/31.07
(58) Field of Search ........................ 106/31.07

(56) References Cited

U.S. PATENT DOCUMENTS

| | | | | |
|---|---|---|---|---|
| 5,340,386 A | * | 8/1994 | Vincent et al. | 524/269 |
| 5,514,213 A | * | 5/1996 | Matsumoto et al. | 106/498 |
| 5,725,642 A | * | 3/1998 | Kano et al. | 106/31.07 |
| 5,753,015 A | * | 5/1998 | Sinwald et al. | 106/31.34 |
| 5,888,291 A | * | 3/1999 | Chopin et al. | 106/466 |
| 6,074,474 A | * | 6/2000 | Broome et al. | 106/486 |
| 6,210,471 B1 | * | 4/2001 | Craig | 106/31.08 |

\* cited by examiner

*Primary Examiner*—C. Melissa Koslow
*Assistant Examiner*—Veronica F. Faison
(74) *Attorney, Agent, or Firm*—Sherman & Shalloway

(57) ABSTRACT

A multi-color crayon or oil pastel which features excellent drawing property, vividness of color and intimate adhesion of multi-color picture in combination, and a method of preparing the same. The multi-color crayon or oil pastel comprises a continuous matrix of a crayon or oil pastel material and a plurality of kinds of granular coloring phases dispersed in the matrix, the granular coloring phases being formed of a collapsible granular material which includes a coloring matter of a hue different from that of the continuous matrix, a body, and a water-soluble or solvent-soluble high molecular material or a water-swelling clay mineral (e.g., bentonite).

5 Claims, No Drawings

MULTI-COLOR CRAYON OR OIL PASTEL AND METHOD OF PRODUCING THE SAME

BACKGROUND OF THE INVENTION

1. Field of the Invention

The present invention relates to a multi-color crayon or oil pastel and to a method of producing the same. More specifically, the invention relates to a multi-color crayon or oil pastel which features excellent drawing property, vividness of color and intimate adhesion of multi-color picture in combination, and to a method of producing the same.

2. Related Art of the Invention

Solid drawing materials have been known already combining materials of different color tones.

Japanese Examined Utility Model Publication (Kokoku) No. 2428/1964 discloses a color pencil in which a core material is formed by dispersing several kinds of mass-like core materials of different color tones in a color material of a basic color to thereby form a color surface of the core material which changes discretely on every transverse cross section, and the circumference thereof in the direction of length is surrounded by a core protection member (prior art a).

Further, Japanese Unexamined Utility Model Publication (Kokai) No. 86141/1976 discloses the structure of a color pencil having a core which is formed by laminating a plurality of core materials having different colors continuously and aslant (prior art b).

As for multi-color crayons, Japanese Unexamined Patent Publication (Kokai) No. 202361/1982 discloses a composite crayon of a given shape by blending two or more crayons of different colors like a pattern (prior art c).

Similarly, Japanese Unexamined Patent Publication (Kokai) No. 57683/1988 discloses a method of producing a crayon by blending several kinds of granular materials having different hues, filling a mold with the blend, and molding the blend with the application of a pressure (prior art d).

Further, Japanese Unexamined Utility Model Publication (Kokai) No. 60488/1992 discloses a multi-crayon obtained by molding crayons having red, yellow, blue, white, black and any other color into any desired shape (prior art e).

Japanese Unexamined Patent Publication (Kokai) No. 219840/2000 discloses a drawing material obtained by spirally arranging layers of different hues (prior art f).

Prior arts a and b are related to color pencils that are suited for drawing fine lines but are not suited for drawing thick lines or painting wide areas. In general, further, color pencils exhibit colors which are pale, and are not capable of producing vivid and intense color.

According to the prior arts a to e, there are used the same materials having different color tones. In this case, however, peeling occurs on an interface of different colors, and the drawing material in the form of a stick tends to be easily broken. Further, when it is attempted to adhere the materials of different colors on the interface, the colors are mixed together and become turbid.

In order to solve this problem according to the prior art f, the strength of the drawing material is improved by twisting together the materials of different hues in a spiral manner. This method can be applied to forming pencil cores and cores for ever-sharp pencils, that are obtained in a half-solid state without being melted, but can be applied with considerable difficulty to obtaining crayons, oil pastels, solid paints and rouges, which are obtained by once melting the materials followed by solidification by cooling and molding.

SUMMARY OF THE INVENTION

It is therefore an object of the present invention to provide a multi-color crayon or oil pastel which features excellent drawing property, vividness of color and intimate adhesion of multi-color picture in combination, and a method of producing the same.

Another object of the present invention is to provide a multi-color crayon or oil pastel which vividly expresses colors of tones different from that of a basic color which is broad and smooth, permits smooth drawing with these different colors, and features a sufficiently high degree of adhesion to the surface of the paper, yet maintaining a high degree of strength.

According to the present invention, there is provided a multi-color crayon or oil pastel comprising a continuous matrix of a crayon or oil pastel material and a plurality of kinds of granular coloring phases dispersed in the matrix, wherein the granular coloring phases are formed of a collapsible granular material which includes:

(A) a coloring matter of a hue different from that of the continuous matrix;

(B) a body; and (C) a water-soluble or solvent-soluble high molecular material or a water-swelling clay mineral.

In the multi-color crayon or oil pastel of the present invention, it is desired that the collapsible granular material is porous, and has a particle diameter of from 0.05 to 2 mm.

According to the present invention, there is further provided a method of producing a multi-color crayon or oil pastel comprising:

a step of preparing a collapsible granular material by mixing (A) a coloring matter having a hue different from that of the crayon or oil pastel material, (B) a body, and (C) a solution of a water-soluble or solvent-soluble high molecular material or of a water-swelling clay mineral, drying the mixture and, as required, pulverizing and classifying the mixture; and a step of dispersing a plurality of kinds of collapsible granular materials in the molten crayon or oil pastel material, followed by the injection molding to mold the mixture into a crayon or an oil pastel.

DETAILED DESCRIPTION OF THE INVENTION

A multi-color crayon or oil pastel of the present invention comprises a continuous matrix of a crayon or oil pastel material and a plurality of kinds of granular coloring phases dispersed in the matrix, wherein the granular coloring phases are formed of a collapsible granular material which includes (A) a coloring matter of a hue different from that of the continuous matrix, (B) a body, and (C) a water-soluble or solvent-soluble high molecular material or a water-swelling clay mineral.

In the multi-color crayon or oil pastel of the present invention, the crayon or oil pastel material is forming a continuous matrix which offers smoothly drawing property, intimate adhesion or fixing property to the paper and vivid picture as is widely known among people skilled in the art.

In the present invention, a plurality of kinds of granular coloring phases formed of collapsible granular materials are dispersed in the continuous matrix making it possible to form pictures of different hues due to the granular coloring phases in the band of a picture drawn by the continuous matrix.

The collapsible granular materials stand for those which maintain the form of granular materials in the continuous matrix of the crayon or oil pastel material, but are collapsed to assume a powdery form or a form close thereto in a state where a pressure or a sliding force is applied thereto at the time of drawing.

Due to the presence of the collapsible granular materials in the continuous matrix, the granular materials (granular coloring phases) dispersed in the sliding surface (drawing surface) of the multi-color crayon or oil pastel, are scattered in the powder and are pushed onto the paper so as to be intimately adhered to the paper by the action of a wax present in the crayon or oil pastel material of the continuous matrix.

In the present invention, it is very important that the granular coloring phase is present in the matrix as collapsible particles from the standpoint of vividness of the picture and intimate adhesion to the paper. The granular coloring phase which consists of strong particles is not almost transferred onto the surface of the paper and, hence, no picture is drawn (only a faint trace of drawing remains) or the granular coloring phase peels off the continuous phase.

Further, when the granular coloring phase doesn't exist, in the continuous matrix (the granular coloring phase exists independently), a powder may adhere to the surface of the paper due to the drawing which, however, never intimately adheres thereto.

It is also important that the granular coloring phase (collapsible particles) includes (A) a coloring matter of a hue different from that of the continuous matrix, (B) a body, and (C) a water-soluble or solvent-soluble high molecular material or a water-swelling clay mineral.

That is, the pigment which is the component (A) is essential for drawing a picture of a hue different from that of the continuous matrix and, besides, the body which is the component (B) is also essential for imparting collapsible property to the granular coloring phase as well as for adjusting the density of the picture of the granular coloring phase. Further, the water-soluble or solvent-soluble high molecular material or the water-swelling clay mineral which is the component (C), is a binder component which, too, is essential for maintaining a granular structure in the continuous matrix.

In the multi-color crayon or oil pastel of the present invention, it is desired that the collapsible granular material is porous. Upon using the collapsible granular material which is porous, the multi-color crayon or oil pastel is more reliably collapsed into a powder on the surface of drawing a picture, the crayon or oil pastel material in the continuous matrix enters into voids of the porous granular material, whereby the matrix and the collapsible granular material are integrated together to produce such favorable actions as increasing the strength of adhesion of the porous granular material on the interface and preventing the peeling of the granular material.

It is further desired that the collapsible granular material of the present invention has a particle diameter of from 0.05 to 2 mm and, particularly, from 0.1 to 1 mm from the standpoint of vividness and appearance of the picture.

That is, as the amount of the particles having particle diameters smaller than 0.05 mm increases, the colors are mixed together and become turbid. On the other hand, as the amount of the particles having diameters not smaller than 2 mm increases, color poorly changes on the drawing to lack interest.

The multi-color crayon or oil pastel according to the present invention is produced through:

a step of preparing collapsible granular materials by mixing (A) a coloring matter having a hue different from that of the crayon or oil pastel material, (B) a body, and (C) a solution of a water-soluble or solvent-soluble high-molecular material or of a water-swelling clay mineral, drying the mixture and, as required, pulverizing and classifying the mixture; and a step of dispersing a plurality of kinds of collapsible granular materials in the molten crayon or oil pastel material, followed by the injection molding to mold the mixture into a crayon or an oil pastel.

Upon mixing, drying and, as required, pulverizing and classifying the above-mentioned components, voids from where the solvent has evaporated are formed in the inside to thereby form coloring particles having collapsible property.

The coloring particles can be formed in a variety of colors, such as pearl-like interference color, violet, blue, green, yellow, orange, red, pink, black, etc.

The crayon or oil pastel material is melted, and a plurality of kinds of collapsible granular coloring material are dispersed in the melt. The dispersant is poured into a predetermined mold and is cooled to obtain a multi-color crayon or oil pastel in which a variety of collapsible granular coloring materials are dispersed in the continuous matrix of the crayon or oil pastel material and the two are integrally formed together in this state.

[Collapsible Granular Coloring Materials]
Component (A)

As the coloring matters used for the preparation of collapsible granular coloring materials, there can be used any coloring matter that has heretofore been used for the solid drawing materials without limitation as exemplified below to which only, however, the coloring matters are not limited, as a matter of course.

Black coloring matters such as carbon black, acetylene black, lamp black, ivory black, aniline black, iron black, etc.

Yellow coloring matters such as yellow iron oxide, zinc yellow, cadmium yellow, mineral fast yellow, nickel titanium yellow, naples yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Yellow, etc.

Orange coloring matters such as molybdenum orange, cadmium orange, Chrome Vermilion, Permanent Orange GTR, Pyrazolone Orange, Vulcan Orange, Indanthrene Brilliant Orange RK, Benzidine Orange G, Indanthrene Brilliant Orange GK, etc.

Red coloring matters such as red iron oxide, silver vermilion, Madder Lake, crimson lake, Permanent Red 4R, Lithol Red, Pyrazolone Red, Watchung Red Calcium Salt, Lake Red D, Brilliant Carmine 6B, eosine lake, Rhodamine Lake B, Alizarin Lake, Brilliant Carmine 3B, Quinacrydone Red, diketopyrrolopyrrole, etc.

Brown coloring matters such as umber, sienna, burnt umber, burnt sienna, etc.

Violet coloring matters such as manganese violet, cobalt violet, violet iron oxide, Fast Violet B, Methyl Violet Lake, Quinacrydone Violet, etc.

Blue coloring matters such as prussian blue, ultramarine, cobalt blue, alkali blue lake, Victoria Blue Lake, phthalocyanine blue, metal-free phthalocyanine blue, partially chlorinated product of phthalocyanine blue, fast sky blue, Indanthrene Blue BC, etc.

Green coloring matters such as Chrome Green, chromium oxide, Pigment Green B, Malachite Green Lake, Final Yellow Green G, phthalocyanine green, naphthol green, etc.

White coloring matters such as zinc white, titanium oxide, antimony white, zinc sulfate, etc.

Fluorescent coloring matters such as inorganic fluorescent pigment, organic fluorescent pigment, etc.

Metallic luster flake pigments such as leafing type or non-leafing type aluminum flake pigment, bronze flake pigment, etc.

Pearl essences such as mica pearl pigment coated with titanium oxide, polyester glitter, fish scale white, etc.

The above-mentioned coloring matters can be used alone or in a combination of two or more kinds.

Component (B)

As the bodies, there can be used achromatic pigments that are used for the paints and inks. There can be exemplified the following bodies to which only, however, the bodies are not limited, as a matter of course.

That is, barite powder, barium carbonate, calcium carbonate, kaolin, talc, fired clay, silica, white carbon, alumina white, etc.

Component (C)

As the component that serves as a binder for the above-mentioned coloring matters and bodies, there can be used water-soluble high molecular materials, solvent-soluble high molecular materials and water-swelling clay minerals.

As the water-soluble high molecular materials, there can be nonionic, anionic or cationic water-soluble organic high molecular materials.

As the nonionic high molecular materials, there can be exemplified natural high molecular materials such as starches, mannans, glue plant, agar-agar, hibiscus, tragacanth rubber, gum arabic, dextran, levan, glue, gelatin casein and collagen; semi-synthetic high molecular materials such as methyl cellulose, ethyl cellulose, hydroxyethyl cellulose, etherified starches, cyanoated starches and dialdehyde starches; and synthetic high molecular materials such as polyacrylamide, polyvinyl alcohol (PVA), polyethylene oxide and polyvinyl pyrrolidone.

As the anionic high molecular materials, there can be exemplified natural high molecular materials such as sodium alginate and chitosan; semi-synthesized high molecular materials such as ammonium alginate, carboxymethyl starch, and carboxymethyl cellulose; and synthetic high molecular materials such as sodium polyacrylate, a copolymer of sodium acrylate and acrylamide, sodium polymethacrylate, acrylamide/acrylic acid copolymer, maleic anhydride/vinyl ether copolymer, styrene/sodium sulfonate copolymer and other water-soluble acrylic resins.

Though not water-soluble in a strict sense, there can be similarly used aqueous emulsions of high molecular materials, such as polyvinyl acetate emulsion and ethylene/vinyl acetate copolymer emulsion since they can be diluted with water.

These water-soluble high molecular materials can be used alone or in a combination of two or more kinds.

As the solvent-soluble high molecular materials, there can be used polyvinyl butyral, shellac, acrylic resin, nylon, polyester, alkyd resin and polyurethane to which only, however, they are in no way limited though. These solvent-soluble high molecular materials placed in the market have relatively large molecular weights and work to increase the strengths of the granular materials to an excess degree. It is therefore desired that the solvent-soluble high molecular materials are used in the form of a solution of a low concentration.

It is desired that the water-soluble or solvent-soluble high molecular material used as a binder in the present invention has a melting point higher than melting points of waxes constituting the crayon or oil pastel material. High molecular materials having relatively low melting points, such as polyethylene glycols are not desirable since they melt during the step of production allowing colors to become mixed and turbid.

The water-swelling clay mineral can be represented by the one of the smectite group having a basic crystalline unit layer of a structure in which an alumina octahedral layer is sandwiched between the $SiO_4$ tetrahedral layers. There can be preferably used montmorillonite which is generally called bentonite and hectorite.

They may be the natural ones or synthetic products so far as they possess water-swelling property. Namely, such clay minerals exhibit excellent properties as binders since they permit coloring matters, bodies or matrix components to easily infiltrate into among the basic unit crystal layers.

The water-swelling clay mineral is used in a swollen state being dispersed in water and being mixed with other components. The water-swelling clay mineral exhibits excellent thermal stability compared to the water-soluble or solvent-soluble high molecular materials, and is very advantageous from the standpoint of preventing deterioration at the time of molding the dispersant into a predetermined shape in a heated state.

The composition of the collapsible coloring particles used in the present invention may differ depending upon the kind of the binder and the amount of oil absorbed by the body but generally contains a coloring matter of the component (A) in an amount of from 3 to 40% by weight and, particularly, from 5 to 35% by weight, and contains a body which is the component (B) in an amount of from 60 to 94% by weight and, particularly, from 70 to 90% by weight based on the solid components of the components (A), (B) and (C). As a binder which is the component (C), further, it is desired that a water-soluble or solvent-soluble high molecular material is contained in an amount of from 1 to 10% by weight and, particularly, from 2 to 7% by weight, and a water-swelling clay mineral is contained in an amount of from 1 to 15% by weight and, particularly, from 3 to 9% by weight.

When the amount of the binder component (C) is too large, for example, the granular material becomes so strong that only a faint trace of drawing can be left on the paper or the picture cannot be drawn at all. When the amount of the binder component (C) is too small, on the other hand, the granular material collapses into a powder during the step of production, whereby colors are mixed to become turbid. Therefore, the binder component (C) is used in an amount within the above-mentioned range.

The collapsible coloring particles are prepared by throwing a coloring matter and a body into a mixer or a pulverizer/mixer so as to be mixed well followed by the gradual addition of a solution or a dispersant of the binder component so as to be mixed well. The mixture is then granulated. As the mixer or the pulverizer/mixer, there can be preferably used Henscel's mixer or homo-mixer to which only, however, they are in no way limited as a matter of course. The mixer executes the mixing as well as the granulation simultaneously, which is convenient.

As the solvent for the solvent-soluble high molecular materials, there can be used, depending upon the kinds of the high molecular materials, one or two or more kinds of aliphatic hydrocarbon solvents such as hexane and the like; aromatic solvents such as toluene and xylene; alcohol solvents such as methanol, ethanol and butanol; ether solvents such as diethyl ether and tetrahydrofurane; ketone solvents such as methyl ethyl ketone and cyclohexanone; cellosolve solvents such as methyl cellosolve and butyl cellosolve; and ester solvents such as butyl acetate and the like. Among them, it is desired to use an easily volatile solvent.

Next, the thus obtained granular material is dried to completely remove the water or solvent, and is, then, pulverized and sieved to obtain a collapsible granular coloring material having a predetermined particle diameter that can be used in the present invention.

[Crayon or Oil Pastel Materials]

Crayons include an ordinary crayon comprising chiefly a wax, a water-soluble crayon to which are added a surfactant and a water-soluble resin, and a plastic crayon having an increased strength by the addition of a plastic material. The "crayon material" of the present invention may be any one of these types.

As the wax which constitutes the crayon or oil pastel material, there can be used any one which is usually used for the crayons and oil pastels. Suitable examples include ketone wax, paraffin wax, microcrystalline wax, Japan wax, carnauba wax, candelilla wax, montan wax, polyethylene wax, bees wax, stearic acid, synthetic waxes, polyethylene oxide wax, and acid-modified polyethylene wax.

These waxes can be used in a single kind or in a combination of two or more kinds. From the standpoint of drawing property and strength, however, it is desired to use a plurality of these waxes in combination.

In order to improve the drawing property, these waxes may be blended with a softening agent or an oil. As the softening agent or the oil, there can be exemplified mineral softening agent or oil, such as fluidized paraffin, various animal and plant oils and fats, cured oil, higher fatty acids and various plasticizers.

The crayon or oil pastel material may be blended with coloring matters and, as required, with bodies.

As the coloring matters, there can be used those described in connection with the collapsible coloring particles. Here, since the crayon or the oil pastel material forms a continuous matrix, it is desired to use those of a color tone which is as pale as possible from the standpoint of obtaining an appealing color tone from the collapsible coloring particles.

As the bodies with which the crayon or oil pastel material is to be blended, there can be similarly used those described in connection with the collapsible coloring particles.

In the case of the crayon materials, in general, though the compositions are not necessarily limited to narrow ranges, it is recommended that the waxes are used in an amount of from 50 to 90% by weight, the softening agent or the oil is used in an amount of from 8 to 20% by weight, the coloring matters are used in an amount of from 3 to 25% by weight, and the bodies are used in an amount of from 0 to 7% by weight.

The oil pastel material, on the other hand, uses the softening agent or the oil in an amount relatively larger than the amount used by the crayon. In the case of the oil pastel material, in general, it is recommended that the waxes are used in an amount of from 10 to 40% by weight, the softening agent or the oil is used in an amount of from 15 to 35% by weight, the coloring matters are used in an amount of from 5 to 35% by weight, and the bodies are used in an amount of from 30 to 45% by weight.

The aqueous crayon is blended with a water-soluble high molecular material and a surfactant.

As the water-soluble high molecular material, there can be similarly used those described in connection with the collapsible coloring particles, but a polyethylene glycol is preferably used.

As the surfactant, there can be preferably used nonionic surfactants and, generally, polyoxyethylenealkyl ether, polyoxyethylenealkylphenyl ether, polyoxyethylene fatty acid ester, polyoxyethylene fatty acid amide ether, polyhydric alcohol fatty acid ester, polyoxyethylene polyhydric alcohol fatty acid ester, fatty acid sucrose ester, alkylolamide, and polyoxyalkylene block copolymer.

In the case of the aqueous crayon materials, in general, though the compositions are not necessarily limited to those described below, it is recommended that the waxes are used in an amount of from 40 to 50% by weight, the softening agent or the oil is used in an amount of from 6 to 8% by weight, the water-soluble high molecular material is used in an amount of from 0 to 5% by weight, the surfactant is used in an amount of from 20 to 30% by weight, the coloring matters are used in an amount of from 4 to 20% by weight, and the bodies are used in an amount of from 0 to 4% by weight.

The plastic crayon is blended with a plastic material and a plasticizer.

As the plastic material, there can be used various polyethylenes, and ethylene polymers such as ethylene/vinyl acetate copolymer, ethylene/α-olefin copolymer, ethylene/unsaturated carboxylic acid copolymer and ethylene/unsaturated carboxylic acid ester copolymer.

As the plasticizer, there can be used ester plasticizers such as phthalic acid ester plasticizer, adipic acid ester plasticizer and succinic acid ester plasticizer, as well as polyester plasticizer, phosphoric acid ester plasticizer, chlorine plasticizer and epoxy plasticizer.

In the case of the plastic crayon materials, in general, though the compositions are not necessarily limited to those described below, it is recommended that the waxes are used in an amount of from 30 to 50% by weight, the softening agent or the oil is used in an amount of from 6 to 9% by weight, the plastic material is used in an amount of from 20 to 40% by weight, the plasticizer is used in an amount of from 0 to 5% by weight, the coloring matters are used in an amount of from 4 to 20% by weight, and the bodies are used in an amount of from 0 to 4% by weight.

[Multi-color Crayon or Oil Pastel]

Collapsible coring particles are dispersed in the molten crayon or oil pastel material, and the mixture is poured into a metal mold, cooled and solidified, and is taken out from the metal mold to obtain a multi-color crayon or oil pastel.

In general, the crayon or oil pastel material that serves as a continuous matrix is used at a ratio of from 65 to 85% by weight and the collapsible coloring particles that form a dispersion phase are used at a ratio of from 15 to 35% by weight.

EXAMPLES

The invention will now be further described by way of Examples to which only, however, the invention is in no way limited.

Example 1

| 1-A | parts by weight |
| --- | --- |
| Talc | 3.8 |
| C.I. pigment yellow 1 | 0.4 |
| C.I. pigment white 6 | 0.3 |
| aqueous solution containing 25% of carboxymethyl cellulose | 1 |

Talc, C.I. pigment yellow 1, and C.I. pigment white 6 were introduced into the Henschel's mixer, followed by the addition of an aqueous solution containing 25% of carboxymethyl cellulose little by little with stirring to prepare granules of a size of 3 to 5 mm. The granular material was then dried at 70° C. to completely remove water. The granular material was pulverized by using a pulverizer into a size of about 1 mm, and was subjected to the sieving to remove particles having diameters of not larger than 0.05 mm and having diameters of not smaller than 2 mm, thereby to obtain a yellow granular material.

The C.I. pigment yellow 1 was replaced by C.I. pigment orange 13, C.I. pigment red 57, C.I. pigment blue 15, C.I. pigment green 7 and C.I. pigment violet 23 thereby to similarly obtain orange, red, blue, green and violet granular materials.

| 1-B | parts by weight |
| --- | --- |
| Ketone wax | 12.5 |
| Paraffin | 3 |
| Microcrystalline wax | 1 |
| Fluidized paraffin | 2 |
| Mica pigment coated with titanium oxide | 3 |

Ketone wax, paraffin and microcrystalline wax were melted by being heated at 100 to 120° C., and to which were added the fluidized paraffin and the mica pigment coated with titanium oxide, and the mixture was stirred.

Then, the yellow, orange, red, blue, green and violet granular materials that have been prepared in advance were added thereto each in an amount of 1.5 parts by weight. The mixture was introduced into a metal mold of crayon, solidified by being cooled with water, and was taken out from the metal mold to obtain a multi-color crayon having a base material of a pearl-like tone.

Example 2

2-A

Granular materials of six colors were obtained in the same manner as in 1-A of Example 1.

| 2-B | parts by weight |
| --- | --- |
| Ketone wax | 12.5 |
| Paraffin | 3 |
| Microcrystalline wax | 1 |
| Cured oil | 2 |
| Fluidized paraffin | 11 |
| Calcium carbonate | 22 |
| C.I. pigment yellow 3 | 2 |
| C.I. pigment green 7 | 0.1 |
| C.I. pigment white 6 | 2 |

The above three kinds of pigments and the fluidized paraffin were kneaded well by using a three-roll mill, and were added into a mixture of ketone wax, paraffin, microcrystalline wax and cured oil, which has been heated and mixed, and calcium carbonate was further added thereto with stirring.

To the above mixture were added the granular materials of the above-mentioned colors prepared in advance each in an amount of 2 parts by weight, and the mixture was molded into the shape of a stick by using an oil pastel molding machine thereby to obtain a multi-color oil pastel having a base material of yellowish green color.

Example 3

| 3-A | parts by weight |
| --- | --- |
| Talc | 16 |
| Bentonite (manufactured by Nihon Yuki Nendo Co.) | 1.2 |
| C.I. pigment yellow 1 | 2.4 |
| C.I. pigment white 6 | 1 |
| Water | 6 |

Talc, bentonite, C.I. pigment yellow 1, and C.I. pigment white 6 were introduced into the Henschel's mixer, followed by the addition of water little by little with stirring to prepare granules of a size of 0.5 to 3 mm.

The granular material was pulverized by using a pulverizer into a size of about 1 mm, and was subjected to the sieving to remove particles having diameters of not larger than 0.05 mm and having diameters of not smaller than 2 mm, thereby to obtain a yellow granular material.

The C.I. pigment yellow 1 was replaced by C.I. pigment orange 13, C.I. pigment red 57, C.I. pigment blue 15, C.I. pigment green 7 and C.I. pigment violet 23 thereby to similarly obtain orange, red, blue, green and violet granular materials.

| 3-B | parts by weight |
| --- | --- |
| Ketone wax | 12.5 |
| Paraffin | 3 |
| Microcrystalline wax | 1 |
| Fluidized paraffin | 2 |
| Mica pigment coated with titanium oxide | 3 |

Ketone wax, paraffin and microcrystalline wax were melted by being heated at 100 to 120° C., and to which were added the fluidized paraffin and the mica pigment coated with titanium oxide, and the mixture was stirred.

Then, the yellow, orange, red, blue, green and violet granular materials that have been prepared in advance were added thereto each in an amount of 1.5 parts by weight. The mixture was introduced into a metal mold of crayon, solidified by being cooled with water, and was taken out from the metal mold to obtain a multi-color crayon having a base material of a pearl-like tone.

Example 4

| 4-A | parts by weight |
| --- | --- |
| Calcium carbonate | 16 |
| Synthetic hectorite (manufactured by La Porte Co.) | 1 |
| C.I. pigment yellow 1 | 2.4 |
| Water | 8 |

Calcium carbonate, synthetic hectorite and C.I. pigment yellow 1 were introduced into the Henschel's mixer, followed by the addition of water little by little with stirring to prepare granules of a size of 0.5 to 3 mm.

The obtained granular material was put into an extruder and was extruded through a dice of a diameter of 0.5 mm into a linear form. The granular material was broken into a length of not longer than 1 mm by a crusher, and was dried at 70° C. to completely remove water thereby to obtain a yellow granular material.

The C.I. pigment yellow 1 was replaced by C.I. pigment orange 13, C.I. pigment red 57, C.I. pigment blue 15, C.I. pigment green 7 and C.I. pigment violet 23 thereby to similarly obtain orange, red, blue, green and violet granular materials.

| 4-B | parts by weight |
|---|---|
| Ketone wax | 12.5 |
| paraffin | 3 |
| Microcrystalline wax | 1 |
| Cured oil | 2 |
| Fluidized paraffin | 11 |
| Calcium carbonate | 22 |
| C.I. pigment yellow 3 | 2 |
| C.I. pigment green 7 | 0.1 |
| C.I. pigment 6 | 2 |

The above three kinds of pigments and the fluidized paraffin were kneaded well by using a three-roll mill, and were added into a mixture of ketone wax, paraffin, microcrystalline wax and cured oil, which has been heated and mixed, and calcium carbonate was further added thereto with stirring.

To the above mixture were added the yellow, orange, red, blue, green and violet granular materials that have been prepared in advance each in an amount of 2 parts by weight, and the mixture was molded into the shape of a stick by using an oil pastel molding machine thereby to obtain a multi-color oil pastel having a base oil pastel material of a yellowish green color.

Example 5

5-A

Yellow, orange, red, blue, green and violet granular materials were obtained in the same manner as in the process 4-A of Example 4.

| 5-B | parts by weight |
|---|---|
| Epa-color FP-117 (yellow fluorescent pigment manufactured by Nihon Shokubai Co.) | 2 |
| Potassium titanate | 2 |
| 12-Hydroxystearic acid | 2.5 |
| Stearic acid | 2.5 |
| Cured castor oil | 2 |
| Candelilla wax | 2 |

The 12-hydroxystearic acid, stearic acid, cured castor oil and candelilla wax were heated and melted, and to which were added the Epo-color FP-117 and potassium titanate, followed by the addition of the granular materials of the above-mentioned colors prepared in advance each in an amount of 0.5 parts by weight with stirring. The mixture was introduced into a metallic pipe of an inner diameter of 4 mm and a length of 100 mm, solidified by being cooled with water, and was removed from the metallic pipe to obtain a multi-color crayon of the type of a color pencil core. The multi-color crayon could be used being held in a delivery-type holder or could be used like a color pencil being adhered in a wooden shaft.

Pictures could be smoothly drawn on a predetermined paper by using the multi-color crayons or oil pastels prepared in Examples 1 to 5 described above maintaining vividness. No peeling occurred on the interface between different colors.

The multi-color crayon or oil pastel of the present invention vividly expresses colors of tones different from that of a basic color which is broad and smooth, permits smooth drawing with these different colors, and features a sufficiently high degree of adhesion to the surface of the paper, yet maintaining a high degree of strength.

What is claimed is:

1. A multi-color crayon or oil pastel comprising a continuous matrix of a crayon or oil pastel material and a plurality of kinds of granular coloring phases dispersed in the matrix, wherein the granular coloring phases are formed of a collapsible granular material which includes:

(A) a coloring matter of a hue different from that of the continuous matrix;

(B) a body; and (C) a water-soluble or solvent-soluble high molecular material or a water-swelling clay mineral.

2. A multi-color crayon or oil pastel according to claim 1, wherein said collapsible granular material is porous.

3. A method of producing a multi-color crayon or oil pastel comprising:

a step of preparing a collapsible granular material by mixing (A) a coloring matter having a hue different from that of the crayon or oil pastel material, (B) a body, and (C) a solution of a water-soluble or solvent-soluble high molecular material or of a water-swelling clay mineral, drying the mixture and, as required, pulverizing and classifying the mixture; and a step of dispersing a plurality of kinds of collapsible granular materials in the molten crayon or oil pastel material, followed by the injection molding to mold the mixture into a crayon or an oil pastel.

4. A multi-color crayon or oil pastel according to claim 1, wherein said collapsible granular material has a particle diameter of from 0.05 to 2 mm.

5. A multi-color crayon or oil pastel according to claim 2, wherein said collapsible granular material has a particle diameter of from 0.05 to 2 mm.

* * * * *